(12) United States Patent
Mooney et al.

(10) Patent No.: US 9,224,407 B2
(45) Date of Patent: Dec. 29, 2015

(54) VARYING WRITE POLE SIDE SHIELD GAP

(71) Applicant: Seagate Technology LLC, Cupertino, CA (US)

(72) Inventors: Marcus B. Mooney, Quigley's Point (IE); Angela B. Moore, Dungiven (GB); Aji Baby, Derry (GB); Neil P. McLarnon, Draperstown (GB); Alison M. Bell, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 66 days.

(21) Appl. No.: 14/153,335

(22) Filed: Jan. 13, 2014

(65) Prior Publication Data

US 2015/0199983 A1 Jul. 16, 2015

(51) Int. Cl.
*G11B 5/60* (2006.01)
*G11B 5/265* (2006.01)

(52) U.S. Cl.
CPC .............. G11B 5/265 (2013.01); G11B 5/6082 (2013.01)

(58) Field of Classification Search
CPC .............. G11B 5/11; G11B 5/31; G11B 5/39; G11B 5/60; G11B 5/6082
USPC ...................................................... 360/235.4
See application file for complete search history.

(56) References Cited

U.S. PATENT DOCUMENTS

| | | | |
|---|---|---|---|
| 7,075,756 B1 | 7/2006 | Mallary et al. | |
| 7,295,401 B2 | 11/2007 | Jayasekara et al. | |
| 7,715,152 B2 | 5/2010 | Okada et al. | |
| 7,950,137 B2 | 5/2011 | Bonhote et al. | |
| 7,979,978 B2 | 7/2011 | Han et al. | |
| 8,031,433 B2 | 10/2011 | Yan et al. | |
| 8,264,798 B1 | 9/2012 | Guan et al. | |
| 8,323,727 B2 | 12/2012 | Pentek et al. | |
| 8,339,741 B2 | 12/2012 | Zhang et al. | |
| 8,365,393 B1 | 2/2013 | Benakli et al. | |
| 8,400,731 B1 | 3/2013 | Li et al. | |
| 8,472,138 B2 | 6/2013 | Han et al. | |
| 8,929,027 B1 * | 1/2015 | Sugiyama et al. | 360/125.01 |
| 2003/0210494 A1 * | 11/2003 | Campbell et al. | 360/125 |
| 2008/0273276 A1 * | 11/2008 | Guan | 360/319 |
| 2008/0278861 A1 * | 11/2008 | Jiang et al. | 360/319 |
| 2009/0154009 A1 * | 6/2009 | Le | 360/110 |
| 2009/0168240 A1 * | 7/2009 | Hsiao et al. | 360/125.02 |
| 2011/0075295 A1 * | 3/2011 | Zhang et al. | 360/123.37 |
| 2011/0075299 A1 * | 3/2011 | Olson et al. | 360/235.4 |
| 2011/0261485 A1 * | 10/2011 | Pentek et al. | 360/122 |
| 2012/0162821 A1 | 6/2012 | Lam et al. | |
| 2012/0250187 A1 | 10/2012 | Benakli et al. | |
| 2012/0314324 A1 * | 12/2012 | Guan | 360/123.12 |
| 2013/0242431 A1 * | 9/2013 | Hosomi et al. | 360/119.02 |
| 2014/0272471 A1 * | 9/2014 | Tian et al. | 428/812 |
| 2014/0376131 A1 * | 12/2014 | Linville et al. | 360/235.4 |
| 2015/0085402 A1 * | 3/2015 | Bashir et al. | 360/235.4 |

* cited by examiner

*Primary Examiner* — Allen T Cao
(74) *Attorney, Agent, or Firm* — Hall Estill Attorneys at Law (57) ABSTRACT

A magnetic element can be configured with a write pole that continuously extends from an air bearing surface along a plane orthogonal to the air bearing surface. A magnetic shield can be separated from the write pole by a first gap distance on the air bearing surface throughout a tip portion of the write pole and by a second gap distance distal the air bearing surface along the plane orthogonal to the air bearing surface along a body portion of the write pole with the first and second gap distances measured parallel to the air bearing surface and the second gap distance being greater than the first gap distance.

20 Claims, 5 Drawing Sheets

VARYING WRITE POLE SIDE SHIELD GAP

SUMMARY

Various embodiments may configure a magnetic element with a write pole that continuously extends from an air bearing surface along a plane orthogonal to the air bearing surface. A magnetic shield can be separated from the write pole by a first gap distance on the air bearing surface throughout a tip portion of the write pole and by a second gap distance distal the air bearing surface along the plane orthogonal to the air bearing surface along a body portion of the write pole with the first and second gap distances measured parallel to the air bearing surface and the second gap distance being greater than the first gap distance.

DETAILED DESCRIPTION

To accommodate industry and consumer demand for data storage devices with increased data storage capacity, the magnetic footprint, and corresponding physical footprint, of a data transducer decreases. Such reduction in the size of a data transducer is made difficult by increased numbers of data bits and data tracks per inch that are configured to supply more data bits on a data storage medium, but can diminish the effective magnetic output of the data transducer and jeopardize the magnetic overwriting and bit error rate of the data storage device. While shielding a data transducer can increase data bit resolution, current shielding configurations struggle to balance loss of magnetic flux via shunting with increased magnetic field gradient. Hence, there is a continued interest in shielding configurations that compromises effective magnetic field output for a data transducer with magnetic field gradient and magnetic overwriting capabilities.

Such interest has rendered a magnetic element that has a write pole continuously extending from an air bearing surface along a plane orthogonal to the air bearing surface and a magnetic shield that is separated from the write pole by a first gap distance on the air bearing surface and by a second gap distance distal the air bearing surface along the plane orthogonal to the air bearing surface. The first and second gap distances can each be measured parallel to the air bearing surface and the second gap distance can be greater than the first gap distance to optimize data writing performance. The ability to tune the gap distances at and away from the air bearing surface (ABS) allows for increased data transducer data bit resolution while maintaining effective magnetic field output conducive to high data bit areal density data programming environments.

Figure 1:
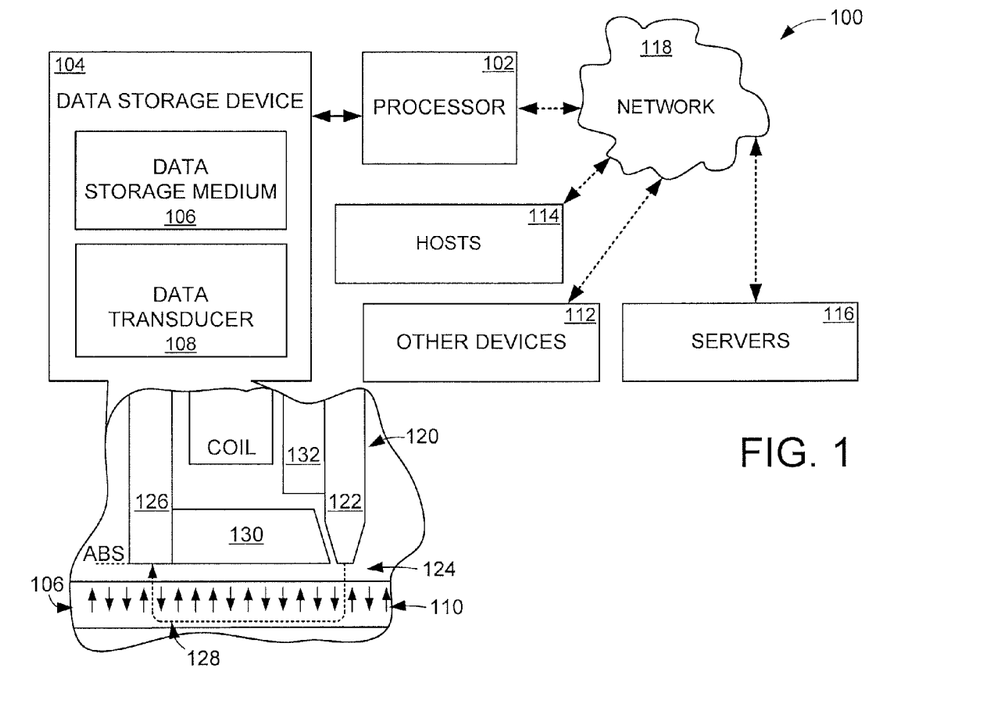
FIG. 1 is a block representation of an example data storage system constructed and operated in accordance with various embodiments.

While a magnetic element with tuned gap distances can be employed in an unlimited variety of data storage environments, FIG. 1 shows a block representation of an example data storage environment 100 configured to utilize tuned write pole and magnetic shield gap distances in accordance with various embodiments. The environment 100 has at least one processor 102, or controller, that communicates with and controls one or more data storage devices 104 individually or simultaneously. The data storage device 104 can be constructed and operated with at least one data storage medium 106, which is accessed by one or more data transducers 108, to store and read data in the form of data bits 110.

Assorted embodiments may package the processor 102 within the data storage device 104, while other embodiments utilize multiple processors 102 internal and external to the data storage device 104. The use of one or more local processors 102 can allow multiple data storage devices 104 to be employed as part of a local data storage scheme. The ability for the processor 102 to communicate to other devices 112, hosts 114, and servers 116 over a network 118 via appropriate protocol, allows for other data storage schemes like redundant array of independent disks (RAID) and data caching, while providing increased computing capabilities. It should be noted that the network 118 can be wired and wireless to connect the local processor 102 to an unlimited variety and number of computing components, without limitation. As such, the data storage environment 100 can be tuned to utilize a diverse range of computing components to provide virtually any type of data storage capability, such as cloud computing, virtual machines, and redundant storage arrays.

In the partial cross-sectional view of a data writer portion 120 of the data storage device 104, the ability of a main write pole 122 to emit magnetic flux across an ABS gap 124, through the data storage medium 106 to a return pole 126 in a circuit 128, allows at least one data bit 110 to be programmed in a perpendicular orientation to the data storage medium 106 with a predetermined polarity. The linear data bit resolution of the data writer portion 120 may be increased by placing a magnetic shield 130 between the main 122 and return 126 poles, but the proximity of the shield 130 to the main write pole 122 may induce magnetic shunting that decreases the effective magnetic field, and magnetic saturation provided by the coil and yoke 132. The reduction in physical and magnetic size of the various aspects of the data writer portion 120 can induce a variety of data programming difficulties, such as increased magnetic noise and reduced cross-track magnetic field gradient that degrade the areal density capacity of the data storage device 104.

Figure 2:
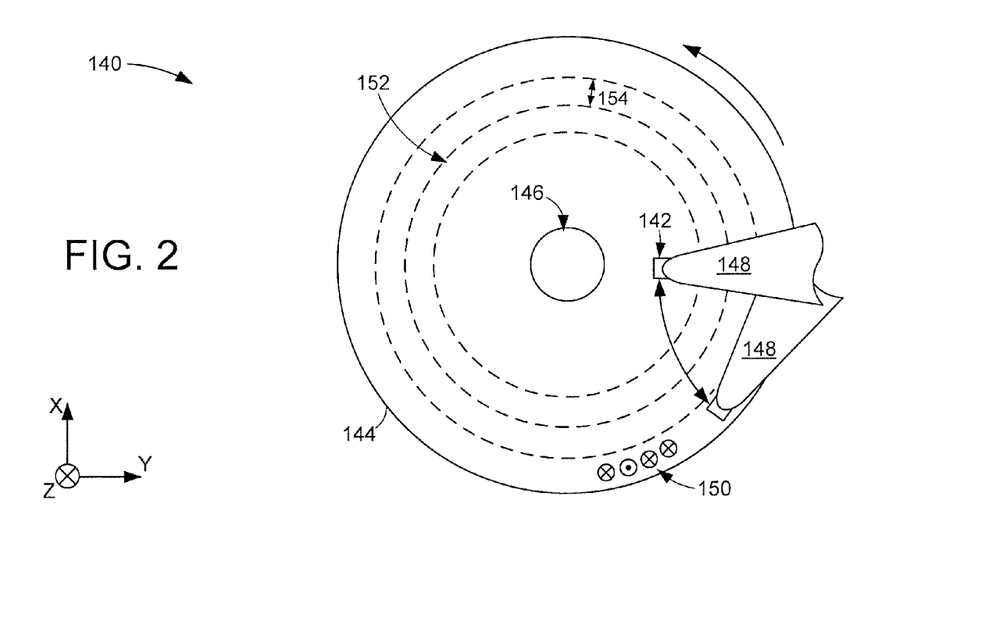
FIG. 2 illustrates a block representation of a portion of a data storage device capable of being used in the data storage device of FIG. 1.

FIG. 2 displays a top view block representation of a portion of an example data storage device 140 configured to employ a tuned data writer in accordance with assorted embodiments. The data storage system 140 has at least one data bit programming transducer 142 positioned adjacent to and separated from a data storage medium 144 by an air bearing. A spindle motor 146 can be controlled by one or more local and remote controllers to rotate the data storage medium 144 and produce a predetermined air bearing gap size. Through movement of the data transducer 142 via an actuator 148 in conjunction with the rotation of the data storage medium 144, selected data bits 150 that are patterned into different data tracks 152 can be accessed to read and write data bit polarities that correspond with logic states and digital memory.

The programming of one or more data bits 150 can be achieved with an unlimited variety of transducing configurations. The data programming transducer 142 may reside on a head gimbal assembly portion of the actuator 148 alone or in combination with other transducing means, such as a data sensing resistive sensor. In an effort to increase the data capacity of the data storage medium 144, the data bits 150 are placed closer together and the data tracks 152 are configured with reduced widths 154. The reduction in space between data bits 150 and data track width 154 is enabled by increased cross-track magnetic field gradient, as measured along the X-Y plane aligned with the track width 154, and is a measure of the performance of the data storage device 140.

That is, a high cross-track gradient can minimize adjacent track interference (ATI) conditions where programming a data bit 150 on a selected data track 154 inadvertently modifies the polarity of a data bit on an adjacent data track. Such ATI conditions can degrade the areal density capacity (ADC) of the data storage device 140. However, risk of ATI conditions can be reduced with tuned magnetic shielding of the data programming transducer 142, which allows for increased ADC for a data storage medium 144, by controlling the magnetic footprint of a write pole portion of the transducer 142.

Figure 3:
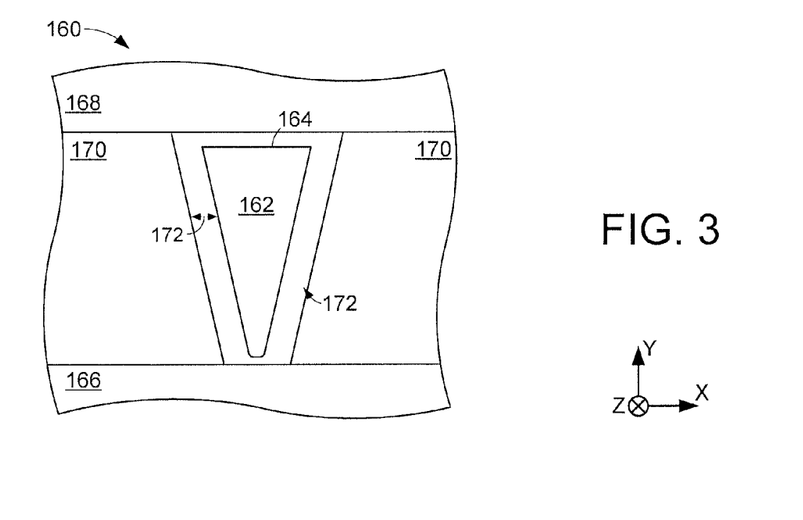
FIG. 3 shows an ABS view block representation of a portion of an example magnetic element capable of being used in the data storage device of FIG. 2.

FIG. 3 illustrates an ABS view block representation of a portion of an example data programming transducer 160 capable of being used in the data storage device 140 of FIG. 2 with increased data bit resolution due to tuned magnetic shielding. The write pole 162 has a substantially trapezoidal shape that can aid in positioning magnetic flux at the trailing edge 164, which can aid in programming data bits configured with a high areal density in data tracks with reduced widths. Trailing 166, leading 168, and side 170 shields can further be tuned for size, shape, and material to balance magnetic shielding with the risk of magnetic shunting.

While the leading 168 and trailing 166 shields can respectively be tuned to enhance magnetic performance of the write pole 162, the side shields 170 are respectively positioned to face greater amounts of write pole 162 surface area compared to the leading 168 and trailing 166 shields. The greater surface area proximity of the side shield 170 emphasizes the size of the side shield write gap 172. A smaller write gap 172 can provide increased magnetic shielding at the ABS, but can be prone to increased amounts of magnetic shunting between portions of the write pole 162 and side shields 170, which can degrade the effective magnetic field of the write pole 162 and the ability of the transducer 160 to quickly and accurately program data bits.

Figure 4:
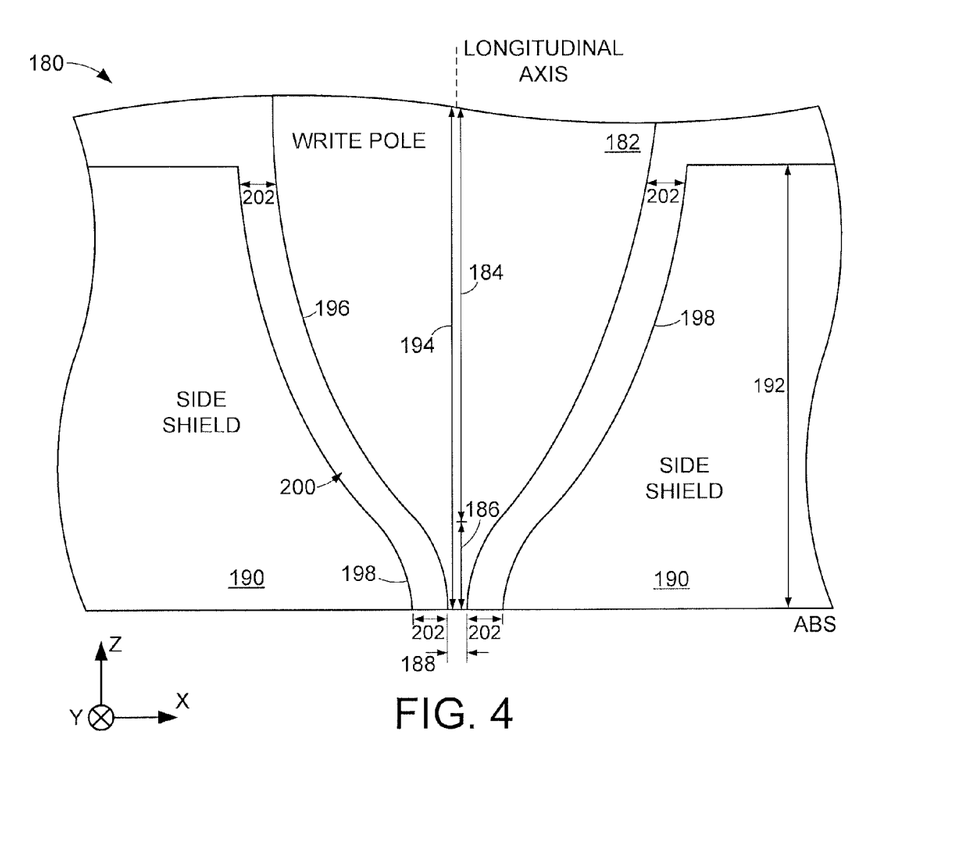
FIG. 4 displays a cross-sectional block representation of an example magnetic element constructed in accordance with various embodiments.

FIG. 4 is a cross-sectional block representation of a portion of an example data writer 180 configured with tuned shielding in accordance with various embodiments to balance data bit writing resolution with the risk of magnetic shunting. The write pole 182 can be configured with a substantially T-shape that corresponds with a wider body portion 184 that tapers to a tip portion 186 with a smaller width 188 to accumulate magnetic flux at the ABS for efficient delivery to a predetermined portion of an adjacent data storage medium. The shaped configuration of the write pole 182 can be complemented by similarly shaped side shields 190 positioned on opposite lateral sides of the write pole 182 and continuously extending from the ABS to a stripe height 192 that is less than the length 194 of the write pole 182. Track data bit density resolution may be increased by incorporating the side shields 190, positioned lateral and opposite the write pole 182 on the ABS.

As shown, the write pole 182 can have continuously curvilinear sidewalls 196 that transition from the body portion 184 to the ABS. It is contemplated that the sidewalls 186 are partially or completely linear to have an unlimited variety of shapes, such as a triangle and trapezoid. Regardless of the shape of the write pole sidewalls 196, each side shield 190 can be configured with write pole facing sidewalls 198 that are similarly shaped throughout the shield stripe height 192 to produce a uniform write gap 200 that is filled with one or more non-magnetic materials. In other words, the side shield sidewalls 198 are configured to match the shape of the write pole sidewall 196 along the tip 186 and body 184 portions to maintain a uniform write gap distance 202 throughout the Z axis and side shield stripe height 192.

While the uniform write gap distance 202 can control magnetic shielding and mitigate some magnetic shunting, reductive scaling the data writer 180 to conform to increased areal data bit densities can diminish cross-track magnetic field gradient, as measured along the X axis. Such reductive scaling can further decrease the uniform gap distance 202 and draw magnetic flux from the write pole 182, which degrades data writing performance. Hence, a uniform write gap 200 can be ineffective in reduced magnetic and physical footprint data storage environments that correspond with high areal data bit density data storage devices.

Figure 5:
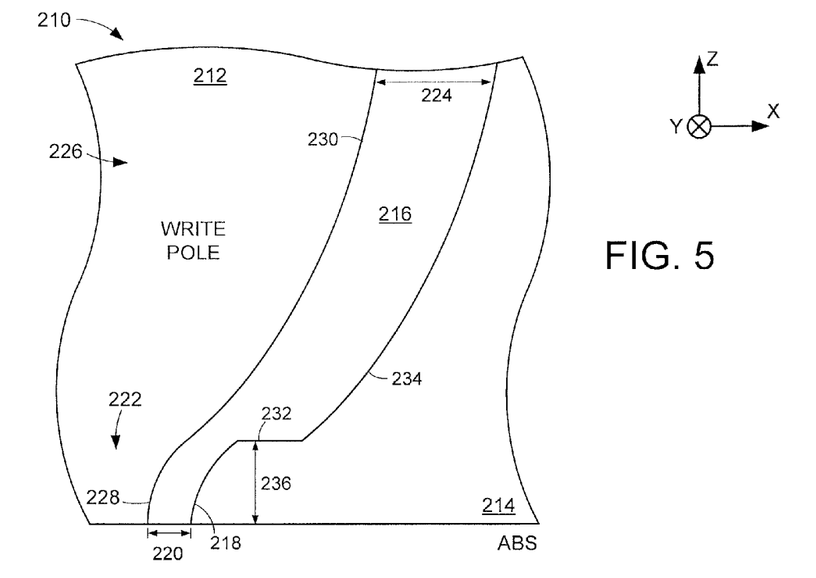
FIG. 5 illustrates a cross-sectional block representation of a portion of an example magnetic element configured in accordance with some embodiments.

Accordingly, FIG. 5 illustrates a cross-sectional block representation of a portion of data programming magnetic element 210 constructed with tuned shielding to balance cross-track magnetic gradient with risk of magnetic shunting in scaled data storage environments. The magnetic element 210 has a shaped write pole 212 that is separated from a magnetic shield 214 by a non-magnetic write gap 216 have a varying width on and away from the ABS. That is, the magnetic shield 214 can be tuned with a tip sidewall 218 that is positioned a first gap distance 220 from the write pole tip 222 at the ABS and a greater second gap distance 224 from the body portion 226 of the write pole 212 distal the ABS.

While not required or limiting, the tip 218 and body 220 sidewalls of the shield 214 can be tuned to be similar or dissimilar angles, shapes, and sizes compared to the tip 228 and body 230 sidewalls of the write pole 212. With the similar sidewall configuration shown in FIG. 5, the first gap distance 220 is maintained from the ABS to a transition surface 232 positioned a predetermined stripe height 234 from the ABS while the second gap distance 224 is maintained from the transition surface 232 along the Z axis, distal the ABS and proximal the body portion 226 of the write pole 212, by shield sidewall 234.

Various embodiments can tune the stripe height 236 of the transition surface 232 to be greater than the length of the tip portion 222 of the write pole 212, as measured along the Z axis. Such position of the transition surface 232 beyond the length of the tip portion 222 of the write pole 212 can provide heightened shielding at the ABS while the increased second gap distance 224 can provide shielding with a reduced risk of shunting between the shield 214 and write pole 212. The ability to tune the gap distances 220 and 224 can optimize cross-track magnetic field gradient and increase the integrity of data bit formation for the write pole 212, which can correspond with decreased amounts of magnetic noise during operation that enables reduced data track widths and greater ADC for a data storage medium. However, the tuned shield sidewalls 218 and 234 and transition surface 232 may be further optimized, in some embodiments, by tuning the material construction of the non-magnetic write gap.

Figure 6A:
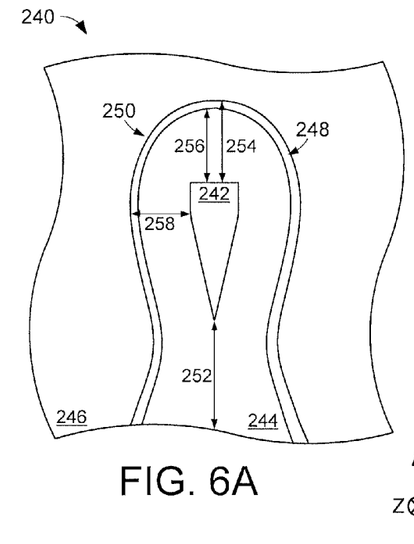
FIGS. 6A and 6B respectively show ABS view block representations of different portions of an example magnetic element constructed in accordance with assorted embodiments.
Figure 6B:
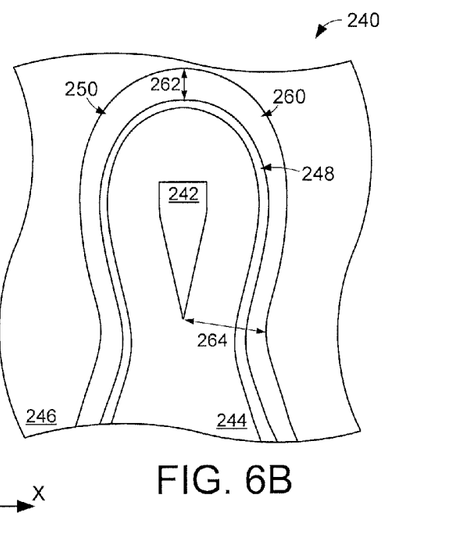

FIGS. 6A and 6B respectively display ABS view block representations mid-process flow of portions of an example data writer 240 configured with a tuned shield and write gap in accordance with assorted embodiments. It should be noted that the layer geometry shown in FIGS. 6A and 6B may be present during construction, but may or may not be the final geometry due, at least in part, to the integration of other design elements. FIG. 6A illustrates how a write pole tip 242 can be circumferentially surrounded on the ABS by a first non-magnetic gap layer 244, which can be constructed of an unlimited variety of non-magnetic materials, such as alumina.

The write pole tip 242 is further separated from one or more magnetic shields 246 by a processing layer 248. That is, the processing layer 248 can partially or completely surround the write pole tip 242 while being disposed between the first non-magnetic gap layer 244 and a variety of shields 246 that can be configured as a single wrap-around shield layer or a plurality of shields, such as side and trailing shields, that contact one another via seams. The processing layer 248 may comprise magnetic or non-magnetic material that aids in constructing the collective write gap lamination 250. In other words, the processing layer 248 may be a seedlayer, such as Ru and Ta, that promotes predetermined structural and magnetic characteristics in materials deposited thereon or as an etch stop layer that prevents the removal of the processing layer 248 and underlying first non-magnetic gap layer 244 during etch processing.

The ability to tune the material, shape, and size of the processing layer 248 allows for increased precision in forming the shaped magnetic shield sidewalls. In the non-limiting example shown in FIG. 6A, the write gap lamination 250 is configured to continuously extend a greater first distance 252 from a leading shield than a second distance 254 from a trailing shield. The tuned thickness 256 of the first non-magnetic gap layer 244 can vary, in some embodiments, to provide different separation distances from various shields. For instance, smaller first non-magnetic gap layer thickness on opposite lateral sides of the write pole tip 242 can combine with the uniform thickness of the processing layer to separate side shields from the write pole tip 242 by a third distance 258 that can be smaller, or greater, than distances 254 and 252.

In FIG. 6B, the write pole tip 242 and write gap lamination 250 are shown from a plane parallel to and distal to the ABS, which can corresponds to the transition surface 232 of FIG. 5. It should be noted that the write pole tip 242 is approximately the same size in FIGS. 6A and 6B, but such configuration is not limiting as various embodiments configure the write gap lamination 250 with an additional second non-magnetic gap layer 260 proximal a body portion of the write pole, which would correspond with a larger write pole tip 242 size. The addition of the second non-magnetic gap layer 260 further separates the write pole tip 242 from adjacent magnetic shields 246.

The thickness 262 of the second non-magnetic gap layer 260 can be tuned individually or in combination with the size and shape of the first non-magnetic gap layer 244 and processing layer 248 to balance the risk of shunting between the write pole tip 242 and magnetic shield 246 with the amount of control of stray magnetic fields. In other words, the size and shape of the write gap lamination 250, as a whole, and as constituent layers can be tuned to vary the distance between magnetic shields 246 and the write pole tip 242 to compromise the degree of magnetic shielding with the probability that shunting will occur between the shield 246 and write pole tip 242.

The write gap lamination 250 can provide varying separation distances between the write pole tip 242 and magnetic shields 246 to further optimize magnetic shielding with the risk of magnetic shunting. As shown, the write gap lamination 250 can have a reduced separation distance 264 proximal the leading edge of the write pole tip 242 compared to the separation distances 252 and 254 of FIG. 6A that respectively separate the leading and trailing edges of the write pole tip 242 from leading and trailing shields. The tuned varying write gap lamination 250 thickness about the write pole tip 242 can complement the varying write gap separation distances 220 and 224 shown in FIG. 5 to position magnetic shields in predetermined locations that are closer to the write pole where magnetic flux is to be most controlled and farther from the write pole where flux control is less important and decreased shunting risk can be provided.

While the tuned size, shape, and position of the various write gap lamination 250 layers can provide a balance between magnetic shielding and shunting, the tuned material construction of the first 244 and second 260 non-magnetic gap layers can further optimize the write gap to increase cross-track magnetic field gradient without degrading the effective magnetic field of the write pole tip 242. Although the first 244 and second 260 non-magnetic gap layers can be constructed of similar materials, various embodiments configure the layers to be dissimilar materials, such as, but not limited to NiCr, NiCu, NiP, SiO2, AlO2, Cr, and Ru.

Figure 7:
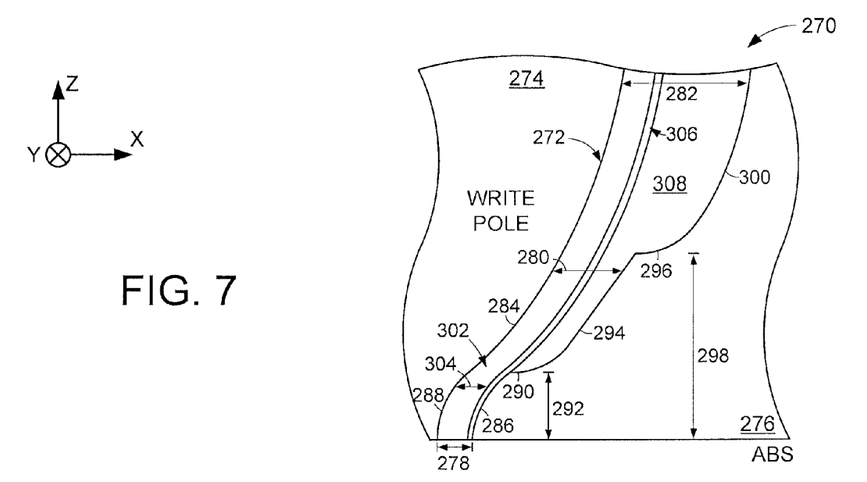
FIG. 7 displays a cross-sectional block representation of a portion of an example magnetic element configured in accordance with various embodiments.

FIG. 7 provides a cross-sectional view block representation of a portion of an example data writer 270 constructed with a write gap lamination 272 having tuned shapes, sizes, and materials in accordance with various embodiments. The cross-sectional view of FIG. 7 illustrates how the write gap lamination 272 can be configured with multiple layers that collectively separate the write pole 274 from a side shield 276. It is contemplated that the a write gap lamination that is independent of lamination 272 or a continuous extension of lamination 272 separates the write pole 274 from a second side shield positioned on an opposite lateral side of the write pole 274, along the X axis and on the ABS.

Regardless of whether or not the write gap lamination 272 continuously extends to the opposite lateral side of the write pole 274, the lamination 272 can be tuned to have a plurality of different gap distances that provide optimized balance of data writer 270 shielding and risk of shunting. As shown, a first gap distance 278 on the ABS is smaller than second 280 and third 282 gap distances that respectively increase the size of the write gap lamination 272 and separation of the write pole 272 and side shield 274. The ability to tune the write gap lamination 272 with any number of different separation distances can be configured in association with the material construction of the various write gap layers to provide predetermined cross-track magnetic field gradient and effective magnetic field on the ABS.

Although the write gap lamination 272 can be shaped to completely match the pole sidewall 284 shape along the Z axis, some embodiments utilize a combination of linear and curvilinear shield sidewall configurations to shape the write gap lamination 272 and tune the performance of the side shield 276 and write pole 274. As shown, the side shield 276 has a tip sidewall 286 that has a matching curvature and length from the ABS, along the Z axis, to the pole tip sidewall 288. That is, the tip sidewall 286 of the shield 276 matches the shape of the pole tip sidewall 288 and continuously extends to a first transition surface 290 positioned a strip height 292 that extends beyond the height of the pole tip sidewall 288. In other words, the tip sidewall 286 provides a uniform gap distance 278 throughout the pole tip sidewall 288, as measured along the Z axis, which can optimize magnetic shielding at the ABS due to the reduced write gap lamination 272 size.

While the first transition surface 290 may be a linear surface oriented parallel to the ABS, the non-limiting embodiment of FIG. 7 configures surface 290 as a continuously curvilinear shape that gradually transitions from the first gap distance 278 to the larger second gap distance 280. The magnetic interaction between the side shield 276 and write pole 274 can further be tuned by constructing a linear sidewall 294 to connect the first transition surface 290 to a second transition surface 296. The linear sidewall 294 can be oriented at any number of non-normal angular orientations with respect to the ABS to provide increasing separation between the write pole 274 and side shield 276 up to the second stripe height 298 position of the second transition surface 296.

It is contemplated that the second transition surface 296 extends from a curvilinear shape to a linear sidewall, much like surface 290 and sidewall 294. However, various embodiments configure the second transition surface 296 to extend from the stripe height 298 into a continuously curvilinear sidewall 300 that may be easier to construct in scaled data writer 270 dimensions conducive to high data bit density data storage devices. With the ability to tune the shape of various portions of the side shield 276 to provide a variety of separation distances, shielding can promote greater cross-track magnetic field gradient that decreases noise and optimizes overwriting capabilities of the write pole 274 without increasing the risk of shunting.

The shape and separation distances provided by the tuned side shield 276 can be configured in association with the material used to create the write gap lamination 272. For instance, a first non-magnetic gap layer 302 can continuously contact the write pole 274 with a uniform thickness 304, as measured parallel to the ABS, and a processing layer 306 having a different uniform thickness can continuously contact the first non-magnetic gap layer 302 to form the first gap distance 278. While various embodiments can utilize varying thicknesses for the first non-magnetic gap layer 302, other embodiments tune a second non-magnetic gap layer 308 to contact the processing layer 306 and laterally extend therefrom with differing thicknesses to provide both the second 280 and third 282 gap distances.

The tuned material selection of the constituent layers of the write gap lamination 272 can further allow for the optimization of data writer 270 performance by delivering high effective write pole 274 magnetic fields without inflating erasure bands that can contribute to ATI and side track erasure (STE) conditions. Although some loss in shielding capabilities can be experienced by the increased gap distances 280 and 282, the tuned construction of the materials of the write gap lamination 272 and the shape of the side shield 276, such as the position of the transition surfaces 290 and 296 as well as the shape of the shield sidewalls 294 and 300, allows for a tradeoff between shielding and greater effective write pole 274 magnetic field.

Figure 8:
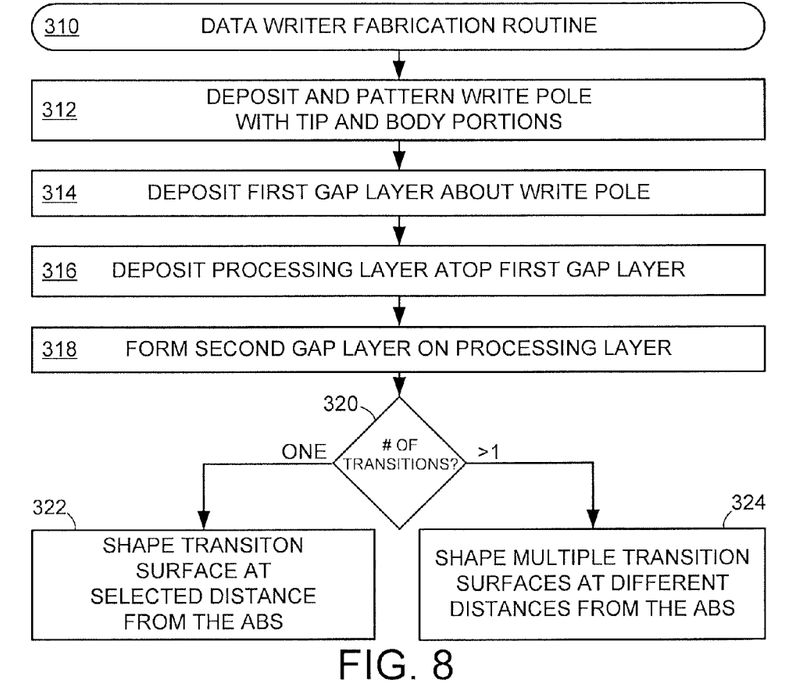
FIG. 8 depicts an example data writer fabrication routine that may be conducted in accordance with some embodiments.

Furthermore, the tuned construction of the write gap lamination 272 can aid in the manufacture of the side shield 276. FIG. 8 displays an example data write fabrication routine 310 that can be carried out in accordance with various embodiments to construct a tuned write gap lamination and shaped side shield. Initially, step 312 deposits and patterns a write pole with a wider body portion, distal the ABS, and a thinner tip portion on the ABS. It is contemplated that step 312 is executed as a combination of sub-steps that successively deposit, mask, and shape magnetic write pole material into the body and tip portions.

The formation of the write pole triggers step 314 to deposit a first gap layer on the write pole. The first gap layer may be a single element or alloy that has a uniform or varying thickness proximal the respective tip and body portions of the write pole. The first gap layer may be constructed to continuously surround the write pole, similarly to layer 244 of FIGS. 6A and 6B. Next, step 316 can deposit a processing layer in contact with the first gap layer and having a thickness that is less than the smallest thickness of the first gap layer.

The material selection of the processing layer in step 316 can determine the manner in which step 318 forms a second gap layer on to the processing layer. That is, an etch stop processing layer can correspond with the subtractive creation of the second gap layer and a seedlayer processing layer can correspond with an additive creation of the second gap layer. Irrespective of the material of the processing layer, various embodiments can sputter or plate a single element or alloy in step 318 to create the second gap layer with a different material than the first gap layer. The ability to tune first and second gap layers to be similar or dissimilar materials can allow precise tuning of the magnetic interaction between the write pole and side shield, such as by providing different magnetic saturation, anisotropy, and magnetic moment values.

Routine 310 can proceed to decision 320 during or after the creation of the second gap layer in step 318 to determine the number of transition surfaces that define the shape of the write gap lamination and side shield. A single transition, such as the configuration shown in FIG. 5, can cause step 322 to shape the second gap layer to form a continuously linear or curvilinear transition surface. A determination of more than one transition surface from decision 320, such as the configuration shown in FIG. 7, advances routine 310 to step 324 where the second gap layer is shaped to provide multiple transition surfaces that have similar or dissimilar shapes.

Figure 9:
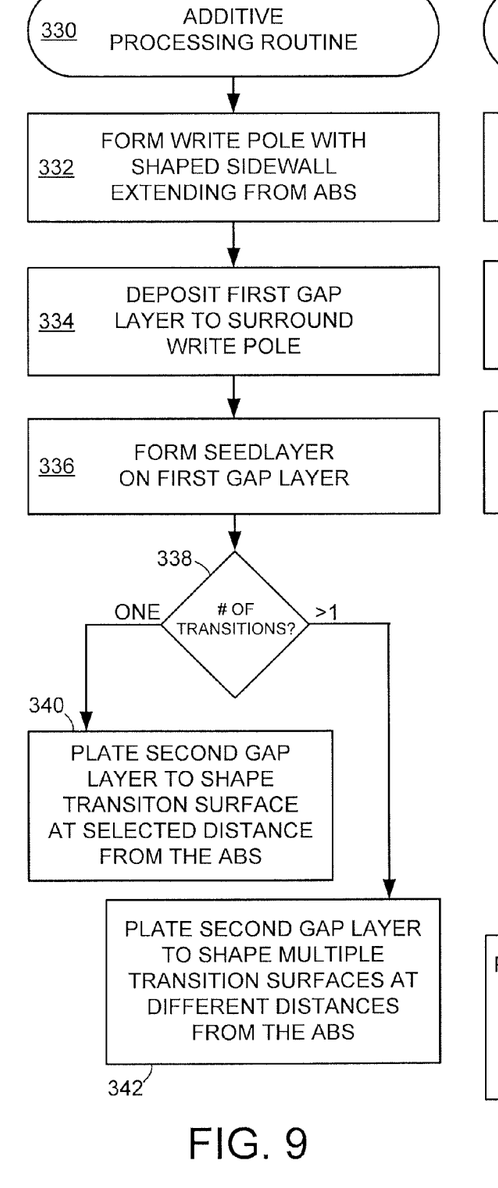
FIG. 9 provides a flowchart of an example additive processing routine carried out in accordance with assorted embodiments.

The utilization of the processing layer in the write gap lamination can allow for efficient construction of the second gap layer and side shield by promoting crystallographic and shaped growth of the magnetic shield while providing a buffer between the first and second gap layers. FIG. 9 illustrates an example additive processing routine 330 that corresponds with the formation of a seedlayer processing layer in accordance with some embodiments. Routine 330 can begin with step 332 forming a write pole with shaped tip and body portions extending from an ABS. It is contemplated that step 332 forms linear and curvilinear write pole surfaces in combination or exclusively.

Step 334 then deposits a first gap layer to partially or completely surround the write pole before a seedlayer, such as Ru or Ta, is formed on the first gap layer in step 336. The seedlayer thickness and position relative to the first gap layer and write pole can be tuned to be a variety of non-limiting configurations that provide efficient means for forming a second gap layer and side shield with accurately shaped features. Decision 338 evaluates and determines how many write gap lamination transitions are to be employed. A determination of a single transition has step 340 plating a second gap layer on to the seedlayer while a determination of multiple transitions triggers step 342 to plate the second gap layer and side shield to shape transition surfaces at different stripe height distances from the ABS.

It can be appreciated that steps 340 and 342 can each correspond with a subsequent removal of a patterned resist material that provides the predetermined size of the second gap layer. Steps 340 and 342 can also precede the formation of a side shield material in contact with various portions of the seedlayer and second gap layer. The plating allowed by the presence of the seedlayer material corresponds with efficient manufacturing of the precise shaped features of the second gap layer and side shield as plating techniques can accurately create curvilinear and linear sidewall features in reduced form factor data writers.

Figure 10:
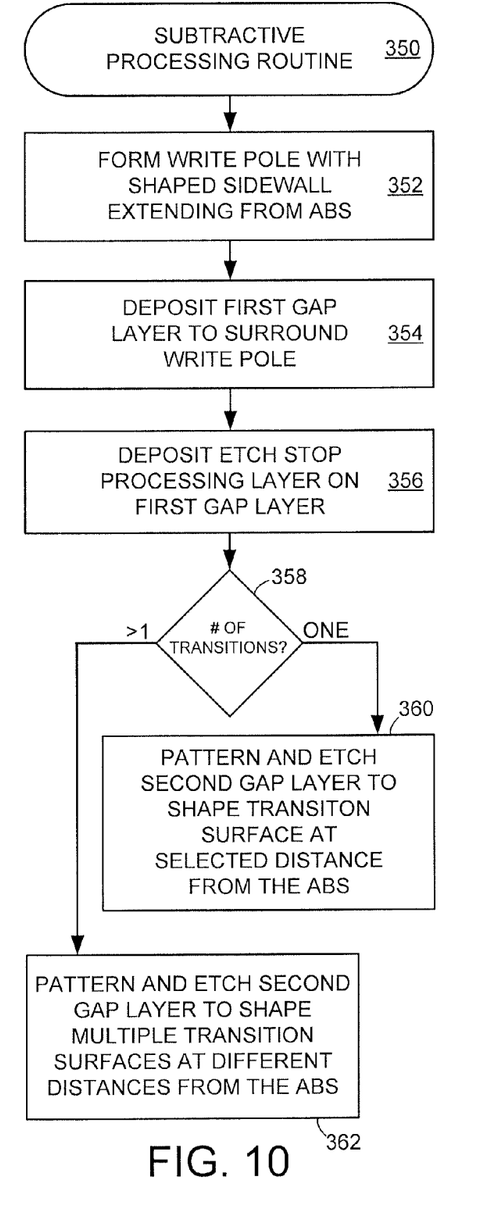
FIG. 10 is a an example subtractive processing routine that may be conducted in accordance with assorted embodiments.

Efficient and accurate construction of a tuned write gap lamination may alternatively be found by employing a subtractive etch based formation of the second gap layer and side shield. FIG. 10 is a flowchart of an example subtractive processing routine 350 that can be utilized in accordance with various embodiments to manufacture a tuned data writer alone or in combination with other routines, such as routine 310 of FIG. 8. Much like step 332 of routine 330, step 352 can form a write pole with shaped tip and body portions extending from the ABS that are subsequently covered by a first gap layer deposited in step 354. The first gap layer is then partially or completely covered by an etch stop material processing layer in step 356 that acts to prevent etching operations from removing the processing or underlying first gap layer.

The etch stop material used in routine 350 can provide increased accuracy, versus a plating operation, for some side shield features. For example, a determination of a single transition surface by decision 358 can proceed to step 360 where a stepped or tapered transition surface, in relation to the ABS, can be formed with increased accuracy compared to a plating process. The increased precision of step 360, as well as in step 362 in the event multiple transition surfaces are chosen in decision 358, may be attributed to the patterning and etched removal of the second gap layer, which contrasts the additive plating approach of routine 330 where shaped write gap lamination features are built up instead of removed.

In other words, the deposition of excess second gap layer material allows for more accurate removal of material compared to the addition of material found in a plated creation of write gap lamination shaped features. However, it should be noted that not all shaped features are more accurately created by the subtractive removal of material as some shapes can be more efficiently and accurately created via plated construction instead of etched removal. Hence, it can be appreciated that the ability to form shaped write gap lamination features with either routine 330 or 350 allows for tuned manufacturing of a data writer to complement the tuned shape, size, and materials of the various constituent layers.

Through the various steps and decision of routines 310, 330, and 350, a magnetic writing element can be constructed with optimized magnetic shielding and shunting by providing a write gap lamination with tuned shapes that define varying write gap distances on and away from the ABS. It should be noted, however, that the various steps and decisions of routines 310, 330, and 350 are not required or limited as the various decisions and steps can be omitted, changed, and added. As a non-limiting example, an additional step or series of steps could form additional shields, such as a second side shield, trailing shield, and leading shield, about the write pole formed in steps 312, 332, and 352, respectively.

With the various tuning capabilities for a write gap lamination, magnetic interaction between a write pole and side shield can be optimized. The ability to tune the materials of the write gap lamination can employ varying structural configurations that promote data writing performance while making construction more efficient and accurate. The ability to tune the interface of the write gap lamination and side shield to have varying shapes to provide different write gap distances further allows for an optimized tradeoff between magnetic shielding at the ABS and effective write pole magnetic field due to decreased risk of shunting distal the ABS. Such optimized write gap lamination and side shield configurations can reduce the risk of ATI and STE conditions that can jeopardize the data integrity of a rotating data storage device, especially in high data bit areal density environments.

While the embodiments have been directed to magnetic programming, it will be appreciated that the claimed technology can readily be utilized in any number of other applications, such as data reading sensors. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
    a write pole continuously extending from an air bearing surface (ABS) along a plane orthogonal to the ABS; and
    a magnetic shield separated from the write pole by a first gap distance on the ABS throughout a tip portion of the write pole and by a second gap distance distal the ABS along the plane orthogonal to the ABS along a body portion of the write pole, the first and second gap distances measured parallel to the ABS with the second gap distance being greater than the first gap distance, the first gap distance is filled with a first gap layer and a gap processing layer continuously extending to opposite sides of the write pole on the ABS.

2. The apparatus of claim 1, wherein the magnetic shield continuously extends from the ABS beyond the tip region of the write pole, distal the ABS.

3. The apparatus of claim 1, wherein the first and second gap distances each are filled with non-magnetic material.

4. The apparatus of claim 1, wherein the first and second gap distances are each filled with a lamination of multiple different materials.

5. The apparatus of claim 1, wherein the second gap distance is filled with the first gap layer, the gap processing layer, and a second gap layer.

6. The apparatus of claim 1, wherein the first gap layer continuously surrounds the write pole on the ABS.

7. The apparatus of claim 1, wherein the first gap layer comprises one of NiCr, NiCu, NiP, $SiO_2$, $AlO_2$, Cr, and Ru.

8. The apparatus of claim 1, wherein a side shield gap continuously extends from the ABS to the second gap distance between the write pole and magnetic shield.

9. The apparatus of claim 1, wherein the gap processing layer continuously extends from the ABS beyond the tip portion of the write pole.

10. A data writer comprising:
    a write pole continuously extending from an air bearing surface (ABS) along a plane orthogonal to the ABS, the plane aligned with first and second magnetic side shields positioned on opposite sides of the write pole; and
    first and second side shield gaps respectively separating the write pole from the first and second magnetic side shields on opposite sides of the write pole, the first side shield gap having a first gap distance on the ABS throughout a tip portion of the write pole and by a second gap distance distal the ABS along the plane orthogonal to the ABS along a body portion of the write pole, the first and second gap distances measured parallel to the ABS with the second gap distance being greater than the first gap distance, the first gap distance is filled with at least a first gap layer and a gap processing layer continuously extending to opposite sides of the write pole on the ABS.

11. The data writer of claim 10, wherein the write pole, first and second magnetic side shields, and first and second side shield gaps are symmetric about a longitudinal axis of the write pole.

12. The data writer of claim 10, wherein the write pole is positioned between at least one leading and trailing shield.

13. The data writer of claim 12, wherein the write pole is separated from the leading shield by a first ABS distance on the ABS and separated from the trailing shield by a second ABS distance on the ABS, the first ABS distance being greater than the second ABS distance.

14. A magnetic element comprising:
a write pole continuously extending from an air bearing surface (ABS) along a plane orthogonal to the ABS; and
a magnetic shield separated from the write pole by a uniform first gap distance on the ABS throughout a tip portion of the write pole and by a second gap distance distal the ABS along the plane orthogonal to the ABS along a body portion of the write pole, the first and second gap distances measured parallel to the ABS with the second gap distance being greater than the first gap distance, the first gap distance is filled with a first gap layer and a gap processing layer continuously extending to opposite sides of the write pole on the ABS.

15. The magnetic element of claim 14, wherein the tip portion of the write pole has a smaller width than the body portion of the write pole as measured parallel to the ABS.

16. The magnetic element of claim 14, wherein the magnetic shield has a transition region that increases the first gap distance to the second gap distance.

17. The magnetic element of claim 16, wherein the transition region comprises a linear surface.

18. The magnetic element of claim 16, wherein the transition region comprises a curvilinear surface.

19. The magnetic element of claim 16, wherein the second gap distance is uniform from the transition region along the body portion of the write pole.

20. The magnetic element of claim 14, wherein the magnetic shield is separated from the body portion of the write pole by a third gap distance, the third gap distance being greater than the first and second gap distances, respectively.

* * * * *